United States Patent
Pani et al.

(10) Patent No.: US 10,362,622 B2
(45) Date of Patent: *Jul. 23, 2019

(54) MANAGEMENT AND SETUP OF ENHANCED MAC-E/ES RESOURCES IN CELL-FACH STATE

(71) Applicant: Signal Trust for Wireless Innovation, Wilmington, DE (US)

(72) Inventors: Diana Pani, Montreal (CA); Rocco DiGirolamo, Laval (CA); Christopher R. Cave, Dollard-des-Ormeaux (CA); Paul Marinier, Brossard (CA); Benoit Pelletier, Roxboro (CA)

(73) Assignee: Signal Trust for Wireless Innovation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/836,302

(22) Filed: Dec. 8, 2017

(65) Prior Publication Data

US 2018/0103501 A1    Apr. 12, 2018

Related U.S. Application Data

(63) Continuation of application No. 15/182,218, filed on Jun. 14, 2016, now Pat. No. 9,844,093, which is a
(Continued)

(51) Int. Cl.
*H04W 76/27*  (2018.01)
*H04W 72/04*  (2009.01)
(Continued)

(52) U.S. Cl.
CPC ........... *H04W 76/27* (2018.02); *H04L 1/1812* (2013.01); *H04L 5/0055* (2013.01);
(Continued)

(58) Field of Classification Search
CPC combination set(s) only.
See application file for complete search history.

(56) References Cited

U.S. PATENT DOCUMENTS 6,167,248 A    12/2000    Hamalainen et al.
6,246,692 B1    6/2001    Dai et al.
(Continued)

FOREIGN PATENT DOCUMENTS

CA    2 615 915    3/2004
GB    2 371 179    7/2002
(Continued)

OTHER PUBLICATIONS

Ericsson, "Contention resolution for enhanced uplink in CELL_FACH," 3GPP TSG RAN WG2 #60bis, R2-080043, Sevilla, Spain (Jan. 14-18, 2008).
(Continued)

*Primary Examiner* — Yee F Lam
(74) *Attorney, Agent, or Firm* — Volpe and Koenig, P.C.

(57) ABSTRACT

A method and apparatus are disclosed to manage the enhanced medium access control-e (MAC-e) and enhanced MAC-es resources and respective variables for the enhanced dedicated channel (E-DCH) in the enhanced Cell_FACH state. Due to the nature of the E-DCH transmission in the uplink (UL) in the Cell_FACH state and the fact that a wireless transmit/receive unit (WTRU) might set up and release the E-DCH resources more frequently, methods to deal with the TSN numbering are described.

11 Claims, 7 Drawing Sheets

Related U.S. Application Data continuation of application No. 15/049,922, filed on Feb. 22, 2016, now Pat. No. 9,374,816, which is a continuation of application No. 12/256,964, filed on Oct. 23, 2008, now Pat. No. 9,271,280.

(60) Provisional application No. 61/018,567, filed on Jan. 2, 2008, provisional application No. 60/982,528, filed on Oct. 25, 2007.

(51) Int. Cl.
| | |
|---|---|
| H04W 36/18 | (2009.01) |
| H04W 40/00 | (2009.01) |
| H04W 72/14 | (2009.01) |
| H04W 92/12 | (2009.01) |
| H04W 88/08 | (2009.01) |
| H04W 88/12 | (2009.01) |
| H04L 1/18 | (2006.01) |
| H04L 5/00 | (2006.01) |
| H04L 12/863 | (2013.01) |
| H04L 29/12 | (2006.01) |
| H04L 29/08 | (2006.01) |

(52) U.S. Cl.
CPC ........ *H04L 47/624* (2013.01); *H04L 61/6022* (2013.01); *H04L 69/324* (2013.01); *H04W 36/18* (2013.01); *H04W 40/005* (2013.01); *H04W 72/042* (2013.01); *H04W 72/0413* (2013.01); *H04W 72/0433* (2013.01); *H04W 72/14* (2013.01); *H04W 88/08* (2013.01); *H04W 88/12* (2013.01); *H04W 92/12* (2013.01)

(56) References Cited

U.S. PATENT DOCUMENTS

| | | | |
|---|---|---|---|
| 6,721,566 B2 | 4/2004 | Longoni et al. | |
| 6,845,238 B1 | 1/2005 | Muller | |
| 7,079,489 B2 | 7/2006 | Massie et al. | |
| 7,145,889 B1 | 12/2006 | Zhang et al. | |
| 7,406,314 B2 | 7/2008 | Sharma | |
| 7,477,609 B2 | 1/2009 | Agin | |
| 7,480,269 B2 | 1/2009 | Heo et al. | |
| 7,508,792 B2 | 3/2009 | Petrovic et al. | |
| 7,643,515 B2 | 1/2010 | Willenegger | |
| 7,890,094 B2 | 2/2011 | Iwamura | |
| 7,894,390 B2 | 2/2011 | Nakamata et al. | |
| 8,259,752 B2 | 9/2012 | Terry et al. | |
| 8,300,697 B2 | 10/2012 | Farfade et al. | |
| 8,774,104 B2 | 7/2014 | Pelletier et al. | |
| 8,989,082 B2 | 3/2015 | Wigard et al. | |
| 9,313,809 B2 | 4/2016 | Pelletier et al. | |
| 9,844,093 B2 * | 12/2017 | Pani | H04W 72/042 |
| 2003/0223452 A1 | 12/2003 | Toskala et al. | |
| 2004/0052229 A1 | 3/2004 | Terry et al. | |
| 2004/0068505 A1 | 4/2004 | Lee et al. | |
| 2004/0117860 A1 | 6/2004 | Yi et al. | |
| 2005/0026623 A1 | 2/2005 | Fisher | |
| 2005/0053035 A1 | 3/2005 | Kwak et al. | |
| 2005/0054298 A1 | 3/2005 | Chen | |
| 2005/0101299 A1 | 5/2005 | Farnsworth | |
| 2005/0180371 A1 | 8/2005 | Malkamaki et al. | |
| 2005/0249163 A1 | 11/2005 | Kim et al. | |
| 2005/0250504 A1 | 11/2005 | Mikola | |
| 2006/0023629 A1 | 2/2006 | Kim et al. | |
| 2006/0026490 A1 | 2/2006 | Rinne | |
| 2006/0039326 A1 | 2/2006 | Jeong et al. | |
| 2006/0116118 A1 | 6/2006 | Charriere et al. | |
| 2006/0140154 A1 | 6/2006 | Kwak et al. | |
| 2006/0142032 A1 | 6/2006 | Derakhshan et al. | |
| 2006/0172739 A1 | 8/2006 | Wigard et al. | |
| 2006/0182065 A1 | 8/2006 | Petrovic et al. | |
| 2006/0251027 A1 | 11/2006 | Chun et al. | |
| 2006/0280145 A1 | 12/2006 | Revel et al. | |
| 2007/0047445 A1 | 3/2007 | Usuda et al. | |
| 2007/0064665 A1 | 3/2007 | Zhang et al. | |
| 2007/0115871 A1 | 5/2007 | Zhang et al. | |
| 2007/0135113 A1 | 6/2007 | Moinet et al. | |
| 2007/0189237 A1 | 8/2007 | Jaatinen et al. | |
| 2007/0206531 A1 | 9/2007 | Pajukoski et al. | |
| 2007/0213059 A1 | 9/2007 | Shaheen | |
| 2007/0223609 A1 | 9/2007 | Obuchi et al. | |
| 2008/0008152 A1 | 1/2008 | Lohr et al. | |
| 2008/0049669 A1 | 2/2008 | Lundby et al. | |
| 2008/0125043 A1 | 5/2008 | Karmanenko et al. | |
| 2008/0192766 A1 | 8/2008 | Ranta-Aho et al. | |
| 2008/0194259 A1 | 8/2008 | Vujcic et al. | |
| 2008/0214225 A1 | 9/2008 | Choukroun et al. | |
| 2008/0268852 A1 | 10/2008 | Petrovic et al. | |
| 2009/0010278 A1 * | 1/2009 | Torsner | H04L 1/0007 370/466 |
| 2009/0061881 A1 | 3/2009 | Gonsa et al. | |
| 2009/0086671 A1 | 4/2009 | Pelletier et al. | |
| 2009/0135769 A1 * | 5/2009 | Sambhwani | H04L 5/0053 370/329 |
| 2009/0143074 A1 | 6/2009 | Pelletier et al. | |
| 2009/0168704 A1 | 7/2009 | Lee et al. | |
| 2009/0168724 A1 | 7/2009 | Umesh et al. | |
| 2009/0196239 A1 | 8/2009 | Lee et al. | |
| 2009/0219868 A1 | 9/2009 | Lee et al. | |
| 2009/0225709 A1 * | 9/2009 | Wager | H04W 72/0413 370/329 |
| 2009/0225739 A1 | 9/2009 | Yeo et al. | |
| 2009/0257407 A1 | 10/2009 | Park et al. | |
| 2009/0318170 A1 * | 12/2009 | Lee | H04W 68/02 455/458 |
| 2010/0091652 A1 | 4/2010 | Lin | |
| 2010/0103452 A1 | 4/2010 | Jactat | |
| 2010/0189071 A1 | 7/2010 | Kitazoe | |
| 2010/0215005 A1 * | 8/2010 | Pradas | H04W 74/006 370/329 |
| 2010/0216471 A1 | 8/2010 | Meyer et al. | |
| 2010/0278143 A1 | 11/2010 | Chun et al. | |
| 2010/0285791 A1 * | 11/2010 | Pirskanen | H04W 74/002 455/422.1 |
| 2010/0309877 A1 | 12/2010 | Damnjanovic et al. | |
| 2011/0164540 A1 | 7/2011 | Lee et al. | |
| 2012/0327833 A1 | 12/2012 | Kim et al. | |
| 2016/0029415 A1 | 1/2016 | Pelletier et al. | |

FOREIGN PATENT DOCUMENTS

| | | |
|---|---|---|
| KR | 20040089937 A | 10/2004 |
| TW | 200640268 | 11/2006 |
| WO | 04/100598 | 11/2004 |
| WO | 05/006829 | 1/2005 |
| WO | 05/020474 | 3/2005 |
| WO | 05/089050 | 9/2005 |
| WO | 05/101886 | 10/2005 |
| WO | 06/043782 | 4/2006 |
| WO | 07/027032 | 3/2007 |
| WO | 07/048470 | 5/2007 |
| WO | 07/077250 | 7/2007 |
| WO | 07/078155 | 7/2007 |
| WO | 08/097489 | 8/2008 |
| WO | 08/137421 | 11/2008 |

OTHER PUBLICATIONS

Ericsson, "Implicit release for enhanced uplink in CELL_FACH," 3GPP TSG RAN WG2 #61bis, R2-081501 (Mar. 31-Apr. 8, 2008).

Ericsson, "Resource release of common E-DCH in CELL_FACH," 3GPP TSG RAN WG2 #60bis, R2-080044 (Jan. 14-18, 2008).

Huawei, "Release procedure of E-RACH," 3GPP TSG RAN2 #60bis, R2-080262 (Jan. 14-18, 2008).

Infineon Technologies, "Multiplexing option selection in case of E_DCH_TRANSMISSION equal FALSE," 3GPP TSG-RAN WG2 Meeting #58, R2-072054, Kobe, Japan, (May 7-11, 2007).

(56) References Cited

OTHER PUBLICATIONS

Infineon, "CELL_FACH E-DCH scheduling simplifications," 3GPP TSG-RAN WG2 Meeting #61, R2-080894, Sorrento, Italy, (Feb. 11-15, 2008).
Infineon, "Resource release mechanisms for CELL_FACH E-DCH," 3GPP TSG-RAN WG2 Meeting #60bis, R2-080148 (Jan. 14-18, 2008).
Nokia Corporation, et al., "Introduction of Uplink Enhanced CELL_FACH in 25.321 (Draft CR)", Change Request, 25.23, CR CRNum, Current version: 8.1.0, 3GPP TSG-RAN W62 Meeting #62, R2-082371, (Kansas City, USA, May 5-9, 2008).
Nokia et al., "CELL_FACH state E-DCH—coverage comparison," 3GPP TSG-RAN WG1 Meeting #50bis, R1-074302 (Oct. 8-12, 2007).
Nokia et al., "Enhanced CELL_FACH State with E-DCH," 3GPP TSG-RAN WG2 Meeting #59bis, R1-074300 (Oct. 8-12, 2007).
Nokia et al., "Resource assignment for E-DCH access in CELL_FACH state," 3GPP TSG-RAN WG1 Meeting #50-BIS, R1-074303 (Oct. 8-12, 2007).
Nokia Siemens Networks, "Draft CR on TS25.435 for Enhanced Uplink in CELL_FACH", Change Request, 25.435, CR, Current Version: 7.8.0, 3GPP TSG-RAN WG3 Meeting #60, R3-081276, (Kansas City, USA, May 5-9, 2008).
Nokia Siemens Networks, "Introduction of Enhanced CELL_FACH state," 3GPP TSG-2 Meeting #57, R2-071556, St. Julian's, Malta (Mar. 26-30, 2007).
Nsn et al, "Further Discussion on Enhanced CELL_FACH in REL8", 3GPP TSG-RAN WG-2 Meeting #59, R2-073254, (Athens, Greece, Aug. 20-24, 2007).
NTT Docomo, Inc., "Issues regarding persistent scheduling," 3GPP TSG RAN WG2 #59, R2-073567, Athens, Greece (Aug. 20-24, 2007).
Qualcomm Europe, "L1/2 aspects for enhanced UL for CELL_FACH," 3GPP TSG-RAN WG1 #50-bis, R1-074126 (Oct. 8-12, 2007).
Qualcomm Europe, "E-DCH Resource Release in CELL_FACH," 3GPP TSG-RAN WG3 #60, R3-081091, Kansas City, Missouri, US (May 5-9, 2008).
Qualcomm Europe, "Empty Buffer Status reporting and Implicit release for CCCH messages using enhanced uplink in CELL_FACH," 3GPP TSG-RAN WG2 #61-bis, R2-081581, Shenzhen, China (Mar. 31-Apr. 4, 2008).
Qualcomm Europe, "E-RNTI handling in Active Set Update procedure," 3GPP TSG-RAN WG 2 Meeting #51, R2-060682 (Feb. 13-17, 2006).
Qualcomm Europe, "Layer 1/2 aspects for enhanced UL for CELL_FACH," 3GPP TSG-RAN WG2 #59bis, R2-074390 (Oct. 8-12, 2007).
Third Generation Partnership Project Support Team, "Minutes of the 59bis TSG-WG2 Meeting (Shanghai, China, Oct. 8-12, 2007)", TSG-RAN WG2 meeting #60, R2-075189, (Korea Nov. 5-9, 2007).
Third Generation Partnership Project Work Area, "Enhanced Uplink for CELL_FACH State in FDD", TSG-RAN #37 Meeting, RP-070677, (Riga, Latvia, Sep. 11-14, 2007).
Third Generation Partnership Project, "Technical Specification Group Radio Access Network; Enhanced Uplink; Overall Description; Stage 2 (Release7)", 3GPP TS 25.319, V7.2.0, (Mar. 2007).
Third Generation Partnership Project, "Technical Specification Group Radio Access Network; Enhanced Uplink; Overall Description; Stage 2 (Release7)", 3GPP TS 25.319, V7.3.0, (Sep. 2007).
Third Generation Partnership Project, "Technical Specification Group Radio Access Network; Enhanced Uplink; Overall Description; Stage 2 (Release7)", 3GPP TS 25.319, V7.6.0, (May 2007).
Third Generation Partnership Project, "Technical Specification Group Radio Access Network; Enhanced Uplink; Overall Description; Stage 2 (Release7)", 3GPP TS 25.319, V8.3.0, (Sep. 2008).
Third Generation Partnership Project, "Technical Specification Group Radio Access Network; Physical Channels and Mapping of Transport Channels Onto Physical Channels (FDD) (Release 7)", TS 25.211, V7.2.0, (May 2007).
Third Generation Partnership Project, "Technical Specification Group Radio Access Network; Physical Channels and Mapping of Transport Channels Onto Physical Channels (FDD) (Release 7)", TS 25.211, V7.3.0, (Sep. 2007).
Third Generation Partnership Project, "Technical Specification Group Radio Access Network; Physical Channels and Mapping of Transport Channels Onto Physical Channels (FDD) (Release 8)", TS 25.211, V8.2.0, (Sep. 2008).
Third Generation Partnership Project, Technical Specification Group Radio Access Network; Medium Access Control (MAC) Protocol Specification (Release 7), 3GPP TS 25.321, V7.5.0, (Jun. 2007).
Third Generation Partnership Project, Technical Specification Group Radio Access Network; Medium Access Control (MAC) Protocol Specification (Release 7), 3GPP TS 25.321, V7.6.0, (Sep. 2007).
Third Generation Partnership Project, Technical Specification Group Radio Access Network; Medium Access Control (MAC) Protocol Specification (Release 7), 3GPP TS 25.321, V7.10.0, (Jun. 2008).
Third Generation Partnership Project, Technical Specification Group Radio Access Network; Medium Access Control (MAC) Protocol Specification (Release 7), 3GPP TS 25.321, V8.3.0, (Sep. 2008).
Third Generation Partnership Project, "Technical Specification Group Radio Access Network; UTRAN Iur Interface User Plane Protocols for Common Transport Channel Data Streams (Release 6)," 3GPP TS 25.425 V6.4.0 (Dec. 2006).
Third Generation Partnership Project, "Technical Specification Group Radio Access Network; UTRAN Iur Interface User Plane Protocols for Common Transport Channel Data Streams (Release 6)," 3GPP TS 25.425 V6.5.0 (Sep. 2008).
Third Generation Partnership Project, "Technical Specification Group Radio Access Network; UTRAN Iur Interface User Plane Protocols for Common Transport Channel Data Streams (Release 7)," 3GPP TS 25.425 V7.5.0 (Oct. 2008).
Third Generation Partnership Project, "Technical Specification Group Radio Access Network; UTRAN Iur Interface User Plane Protocols for Common Transport Channel Data Streams (Release 7)," 3GPP TS 25.425 V7.8.0 (Sep. 2008).
Third Generation Partnership Project, "Technical Specification Group Radio Access Network; UTRAN Iur Interface User Plane Protocols for Common Transport Channel Data Streams (Release 8)," 3GPP TS 25.425 V8.0.0 (Sep. 2008).
Third Generation Partnership Project, Technical Specification Group Radio Access Network; Medium Access Control (MAC) Protocol Specification (Release 7), 3GPP TS 25.321, V7.3.0, (Dec. 2006).
Third Generation Partnership Project, "Technical Specification Group Radio Access Network; Medium Access Control (MAC) protocol specification (Release 1999)," 3GPP TS 25.321 V3.17.0 (Jun. 2004).
Third Generation Partnership Project, "Technical Specification Group Radio Access Network; Medium Access Control (MAC) protocol specification (Release 4)," 3GPP TS 25.321 V4.10.0 (Jun. 2004).
Third Generation Partnership Project, "Technical Specification Group Radio Access Network; Medium Access Control (MAC) protocol specification (Release 5)," 3GPP TS 25.321 V5.13.0 (Mar. 2007).
Third Generation Partnership Project, "Technical Specification Group Radio Access Network; Medium Access Control (MAC) protocol specification (Release 5)," 3GPP TS 25.321 V5.14.0 (Sep. 2008).
Third Generation Partnership Project, "Technical Specification Group Radio Access Network; Medium Access Control (MAC) protocol specification (Release 6)," 3GPP TS 25.321 V6.14.0 (Sep. 2007).
Third Generation Partnership Project, "Technical Specification Group Radio Access Network; Medium Access Control (MAC) protocol specification (Release 6)," 3GPP TS 25.321 V6.16.0 (Sep. 2008).
Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).
Third Generation Partnership Project, "Technical Specification Group Radio Access Network; Physical channels and mapping of transport channels onto physical channels (FDD) (Release 4)," 3GPP TS 25.211 V4.6.0 (Sep. 2002).

(56) References Cited

OTHER PUBLICATIONS

Third Generation Partnership Project, "Technical Specification Group Radio Access Network; Physical channels and mapping of transport channels onto physical channels (FDD) (Release 5)," 3GPP TS 25.211 V5.8.0 (Dec. 2005).
Third Generation Partnership Project, "Technical Specification Group Radio Access Network; Physical channels and mapping of transport channels onto physical channels (FDD) (Release 6)," 3GPP TS 25.211 V6.8.0 (Sep. 2007).
Third Generation Partnership Project, "Technical Specification Group Radio Access Network; Physical channels and mapping of transport channels onto physical channels (FDD) (Release 6)," 3GPP TS 25.211 V6.9.0 (Nov. 2007).
Third Generation Partnership Project, "Technical Specification Group Radio Access Network; Physical channels and mapping of transport channels onto physical channels (FDD) (Release 7)," 3GPP TS 25.211 V7.6.0 (May 2008).
Third Generation Partnership Project; "Technical Specification Group Radio Access Network; UTRAN Iub/Iur interface user plane protocol for DCH data streams (Release 7)," 3GPP TS 25.427 V7.3.0 (Dec. 2006).
Third Generation Partnership Project; "Technical Specification Group Radio Access Network; UTRAN Iub/Iur interface user plane protocol for DCH data streams (Release 8)," 3GPP TS 25.427 V8.0.0 (Mar. 2008).
Third Generation Partnership Project; "Technical Specification Group Radio Access Network; UTRAN Iub/Iur interface user plane protocol for DCH data streams (Release 7)," 3GPP TS 25.427 V7.5.0 (Sep. 2007).
Third Generation Partnership Project; "Technical Specification Group Radio Access Network; UTRAN Iub/Iur interface user plane protocol for DCH data streams (Release 5)," 3GPP TS 25.427 V5.5.0 (Jun. 2005).
Third Generation Partnership Project; "Technical Specification Group Radio Access Network; UTRAN Iub/Iur interface user plane protocol for DCH data streams (Release 6)," 3GPP TS 25.427 V6.8.0 (Dec. 2006).
Third Generation Partnership Project; "Technical Specification Group Radio Access Network; UTRAN Iub/Iur interface user plane protocol for DCH data streams (Release 4)," 3GPP TS 25.427 V4.5.0 (Dec. 2003).
Third Generation Partnership Project; "Technical Specification Group Radio Access Network; Utran Iub/Iur interface user plane protocol for DCH data streams (Release 1999)," 3GPP TS 25.427 V3.11.0 (Dec. 2003).
Third Generation Partnership Project; "Technical Specification Group Radio Access Network; UTRAN Iur interface user plane protocols for Common Transport Channel data streams (Release 1999)," 3GPP TS 25.425 V3.8.0 (Dec. 2003).
Third Generation Partnership Project; "Technical Specification Group Radio Access Network; UTRAN Iur interface user plane protocols for Common Transport Channel data streams (Release 4)," 3GPP TS 25.425 V4.4.0 (Dec. 2003).

Third Generation Partnership Project; "Technical Specification Group Radio Access Network; UTRAN Iur interface user plane protocols for Common Transport Channel data streams (Release 5)" 3GPP TS 25.425 V5.8.0 (Jun. 2005).
Third Generation Partnership Program Support Team, "Current Minutes of the 59bis TSG-RAN WG2 Meeting (Shanghai, China, Oct. 8-12, 2007)", TSG-RAN WG2 Meeting #60, R2-7xxxx, (Korea, Nov. 5-9, 2007).
TSG-RAN-WG2, "Reply LS on Enhanced Uplink for CELL_FACH state in FDD," 3GPP TSG-RAN-WG2 Meeting #60, R2-075472 (Nov. 5-9, 2007).
Nokia Corporation et al., "Introduction of Enhanced Uplink in CELL_FACH in 25.319," 3GPP TSG RAN WG2 meeting #62, R2-082368, Kansas City, USA (May 5-9, 2008). (See pp. 5-7 and 30-35).
Ericsson, "Enhanced Uplink for CELL_FACH," 3GPP TSG RAN WG1 #50-bis, R1-073954, Shanghai, China (Oct. 8-12, 2007).
Third Generation Partnership Project, Technical Specification Group Radio Access Network; Medium Access Control (MAC) Protocol Specification (Release 7), 3GPP TS 25.321, V7.2.0, Sep. 2006 (ETSI TS 125 321 V7.2.0 (Sep. 2006).
Third Generation Partnership Project, Technical Specification Group Radio Access Network; Medium Access Control (MAC) protocol specification (Release 6), 3GPP TS 25.321 V6.13.0 (Jun. 2007).
Third Generation Partnership Project, "Technical Specification Group Radio Access Network; UTRAN Iur Interface User Plane Protocols for Common Transport Channel Data Streams (Release 7)," 3GPP TS 25.425 V7.4.0 (Jun. 2007).
Nokia Corporation et al., "Enhanced Uplink for CELL_FACH in 25.321," 3GPP TSG-RAN WG2 Meeting #61, R2-081774, Shenzhen, China (Mar. 31-Apr. 4, 2008).
Third Generation Partnership Project, "3rd Generation Partnership Project; Technical Specification Group Radio Access Network; Radio Interface Protocol Architecture (Release 7)," 3GPP TS 25.301 V7.3.0 (Sep. 2007).
Third Generation Partnership Project, "Technical Specification Group Radio Access Network; Radio Interface Protocol Architecture (Release 8)," 3GPP TS 25.301 V8.3.0 (Sep. 2008).
Universal Mobile Telecommunications System (UMTS); UTRAN Iub interface Node B Application Part (NBAP)signalling, (3GPP TS 25.433 version 7.6.0 Release 7), ETSI TS 125 433 V7.6.0 (Oct. 2007).
Third Generation Partnership Project, "Technical Specification Group Radio Access Network; UTRAN Iub interface Node B Application Part (NBAP)," 3GPP TS 25.433 V8.2.0 (Sep. 2008).
Nokia Siemens Networks, "On E-DCH resource release," 3GPP TSG-RAN WG2 Meeting #62, R2-082579, Kansas City, USA, (May 5-9, 2008).
Huawei, "RLF back off for Enhanced Uplink in CELL_FACH state," 3GPP TSG-RAN WG2 #63, R2-084415, Jeju Island, KR, (Aug. 18-22, 2008).

* cited by examiner

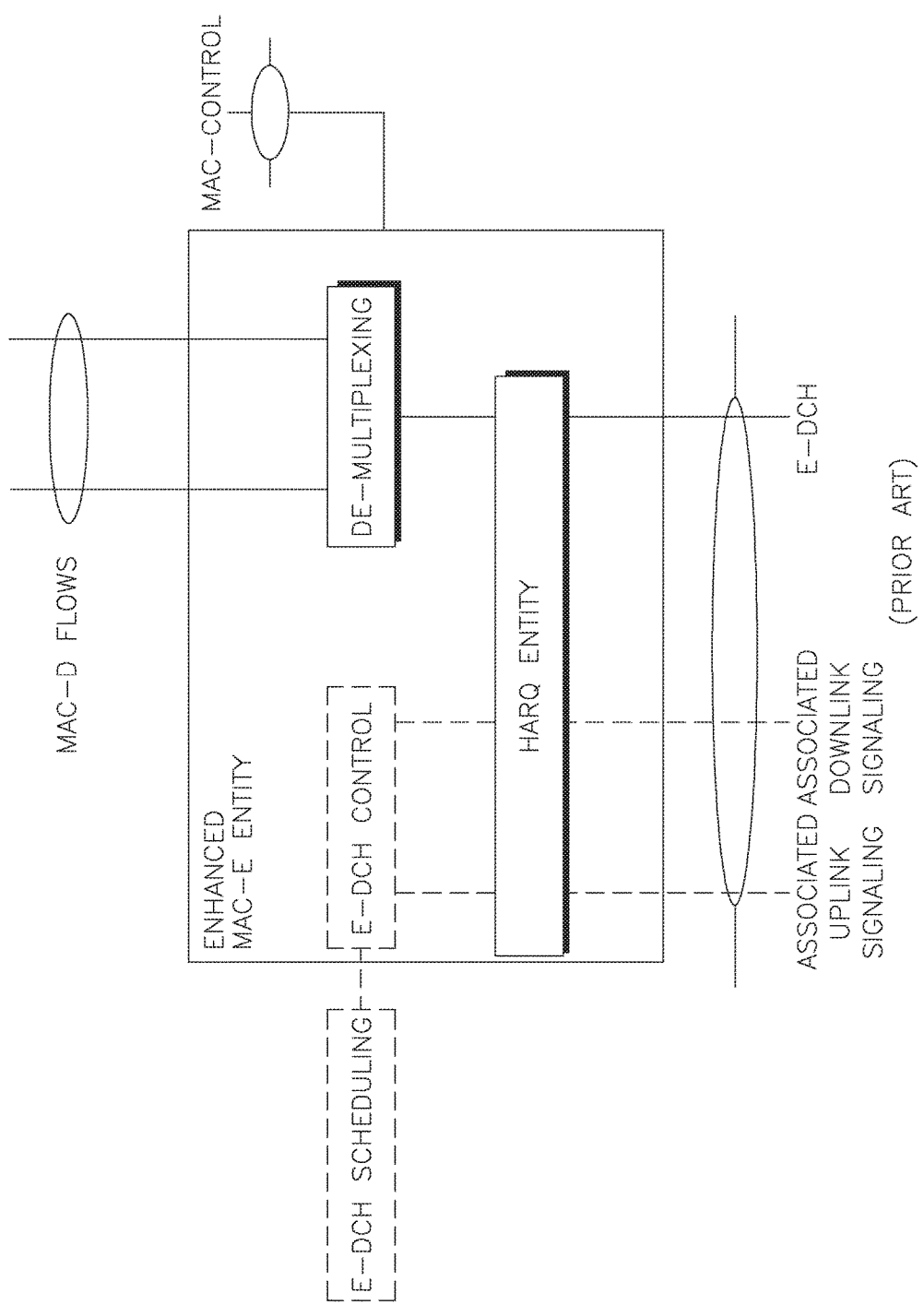

MANAGEMENT AND SETUP OF ENHANCED MAC-E/ES RESOURCES IN CELL-FACH STATE

CROSS REFERENCE TO RELATED APPLICATION

This application is a continuation of U.S. patent application Ser. No. 15/182,218 filed Jun. 14, 2016, which is a continuation of U.S. patent application Ser. No. 15/049,922 filed Feb. 22, 2016, which issued on Jun. 21, 2016, as U.S. Pat. No. 9,374,816, which is a continuation of U.S. patent application Ser. No. 12/256,964 filed Oct. 23, 2008, which issued on Feb. 23, 2016, as U.S. Pat. No. 9,271,280, and which claims the benefit of U.S. Provisional Patent Appl. No. 60/982,528, filed Oct. 25, 2007 and U.S. Provisional Patent Appl. No. 61/018,567, filed Jan. 2, 2008 which are incorporated by reference as if fully set forth.

FIELD OF INVENTION

This application is related to wireless communications.

BACKGROUND

An enhanced uplink mechanism has been introduced for the Third Generation Partnership Project (3GPP) standards. As a part of the enhanced uplink mechanism and improved Layer 2 (L2), new functional entities have been introduced in the medium access control (MAC) including enhanced MAC-e/es entities. In a wireless transmit/receive unit (WTRU), the enhanced MAC-e/es are considered one single sublayer. However in the network side the enhanced MAC-e and the enhanced MAC-es entities may be considered separate, with the enhanced MAC-e residing in the Node-B and the enhanced MAC-es residing in the serving radio network controller (SRNC). One enhanced MAC-e and one enhanced MAC-es entity are present for each WTRU in the Node B and in the SRNC, respectively. The entities are separate in the network so that the more real-time critical functionality of enhanced MAC-e may be placed into the Node-B.

FIG. 1 is a block diagram of an enhanced MAC entity 100 of a WTRU. The enhanced MAC in the WTRU comprises a hybrid automatic repeat-request (HARQ) module, a multiplexing and transmission sequence number (TSN) setting module, an enhanced uplink transport format combination (E-TFC) selection module, and two segmentation modules.

The HARQ module performs the MAC functions relating to the HARQ protocol, including storing enhanced MAC-e payloads and re-transmitting them. The HARQ module determines the E-TFC, the retransmission sequence number (RSN), and the power offset to be used by Layer 1 (L1).

The multiplexing and TSN module concatenates multiple MAC-d protocol data units (PDUs) into enhanced MAC-es PDUs, and multiplexes one or multiple enhanced MAC-es PDUs into a single enhanced MAC-e PDU, to be transmitted in a subsequent transmission time interval (TTI), as instructed by the E-TFC selection module.

The E-TFC selection module performs E-TFC selection according to scheduling information, relative and absolute grants received from a UMTS Terrestrial Radio Access Network (UTRAN) via L1 signalling, and a serving grant signalled through the RRC for arbitration among the different flows mapped on the E-DCH.

The segmentation module performs segmenting of the MAC-d PDUs.

FIGS. 2 and 2A show the enhanced MAC-e and enhanced MAC-es entities located at the Node-B and RNCs, respectively. Referring to FIG. 2, the enhanced MAC-es sublayer manages E-DCH specific functionality. The enhanced MAC-es entity comprises a disassembly module, a reordering and queue distribution module, a reordering/combining module, and a reassembly module.

The reordering queue distribution module routes the enhanced MAC-es PDUs to the correct reordering buffer based on the serving radio network controller (SRNC) configuration and based on the logical channel identity.

The reordering/combining module reorders received enhanced MAC-es PDUs according to the received TSN and Node-B tagging, (i.e. CFN, subframe number). Enhanced MAC-es PDUs with consecutive TSNs are delivered to the disassembly module upon reception.

The macro diversity selection module operates in the enhanced MAC-es, in case of soft handover with multiple Node-Bs.

The disassembly module is responsible for disassembly of enhanced MAC-es PDUs, including removal of the enhanced MAC-es header.

The reassembly function reassembles segmented MAC-d PDUs, and delivers the MAC-d PDUs to the correct MAC-d entity.

Referring to FIG. 2A, shows a MAC-e entity in communication with an E-DCH scheduling module. The enhanced MAC-e entity comprises an E-DCH control module, a de-multiplexing module, and a HARQ entity.

The E-DCH scheduling module manages E-DCH cell resources between WTRUs. Based on scheduling requests, scheduling grants are determined and transmitted.

The E-DCH control module is responsible for reception of scheduling requests and transmission of scheduling grants.

The de-multiplexing module performs the de-multiplexing of enhanced MAC-e PDUs into enhanced MAC-es PDUs. Enhanced MAC-es PDUs are forwarded to the SRNC in their associated MAC-d flow.

The HARQ module may support multiple HARQ processes. Each process is responsible for generating ACKs or NACKs indicating delivery status of E-DCH transmissions.

FIG. 3 shows the radio resource controller (RRC) service states of a 3GPP WTRU with an enhanced uplink. The WTRU may operate in several states which depend on the user activity. The following states have been defined: Idle, Cell_DCH, Cell_FACH, URA_PCH and Cell_PCH. The RRC state changes are controlled by the network using RNC parameters, the WTRU does not decide to perform state changes by itself.

In the Cell_DCH state, a dedicated physical channel is allocated to the WTRU in the uplink and the downlink. The WTRU is known on a cell level according to its current active set. The WTRU may use dedicated transport channels, shared transport channels, or a combination of these transport channels.

A WTRU is in the Cell_FACH state if it has been assigned to use the common control channels (e.g. CPCH). In the Cell_FACH state, no dedicated physical channel is allocated to the WTRU, and the WTRU continuously monitors a FACH (e.g., S-CCPCH) or a High Speed Downlink Shared Channel (HS-DSCH) in the downlink. The WTRU is assigned a default common or shared transport channel in the uplink (e.g. RACH) that it can use anytime according to the access procedure for that transport channel. The position of the WTRU is known by the UTRAN on a cell level according to the cell where the WTRU last performed a cell update.

In the Cell_PCH state, no dedicated physical channel is allocated to the WTRU. The WTRU selects a PCH, and uses discontinuous reception for monitoring the selected PCH via an associated PICH. No uplink activity is possible. The position of the WTRU is known by the UTRAN on a cell level according to the cell where the WTRU last performed a cell update in the CELL_FACH state.

In the URA_PCH state, no dedicated channel is allocated to the WTRU. The WTRU selects a PCH, and uses discontinuous reception for monitoring the selected PCH via an associated PICH. No uplink activity is possible. The location of the WTRU is known on a UTRAN registration area level according to the URA assigned to the WTRU during the last URA update in the Cell_FACH state.

As a part of the enhanced uplink mechanism an, enhanced random access channel (E-RACH) has been introduced for the CELL_FACH state. The E-RACH refers to the use of the enhanced dedicated channel (E-DCH) in the Cell_FACH state or the resource/physical channel used by the WTRU for uplink contention-based access. Previously, the only uplink mechanism for a WTRU in the Cell_FACH state was transmission via the RACH using a slotted-Aloha approach with an acquisition indication message.

With the introduction of the E-DCH in the Cell_FACH state, the WTRUs and the network may require the introduction of enhanced MAC-e/es entities in order to enable the communication between the WTRU and the network. Due to the nature of the E-DCH operation in the Cell_FACH state, a number of issues may arise with the E-DCH MAC resources. One of the issues relates to defining how and when to set up the enhanced MAC-e/es entities. In addition, rules regarding the location of the enhanced MAC-e/es entities and whether the enhanced MAC-e and/or enhanced MAC-es are common or dedicated entities are desired. Also, additional RNC to Node-B interface (Iub) signaling for the setup and management of the MAC entities are desired. Accordingly methods to manage E-DCH resources and to manage TSN numbering are desired.

SUMMARY

Methods and apparatus are disclosed to manage the enhanced MAC-e and enhanced MAC-es resources and respective variables for the E-DCH in the enhanced Cell_FACH state. Due to the nature of the E-DCH transmission in the uplink (UL) in the Cell_FACH state and the fact that the WTRU might set up and release the E-DCH resources more frequently, methods to manage the TSN numbering are described.

BRIEF DESCRIPTION OF THE DRAWINGS

A more detailed understanding may be had from the following description, given by way of example in conjunction with the accompanying drawings wherein:

FIGS. 2 and 2A are block diagrams of enhanced MAC-e/es entities of a Node-B and an RNC, respectively;

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
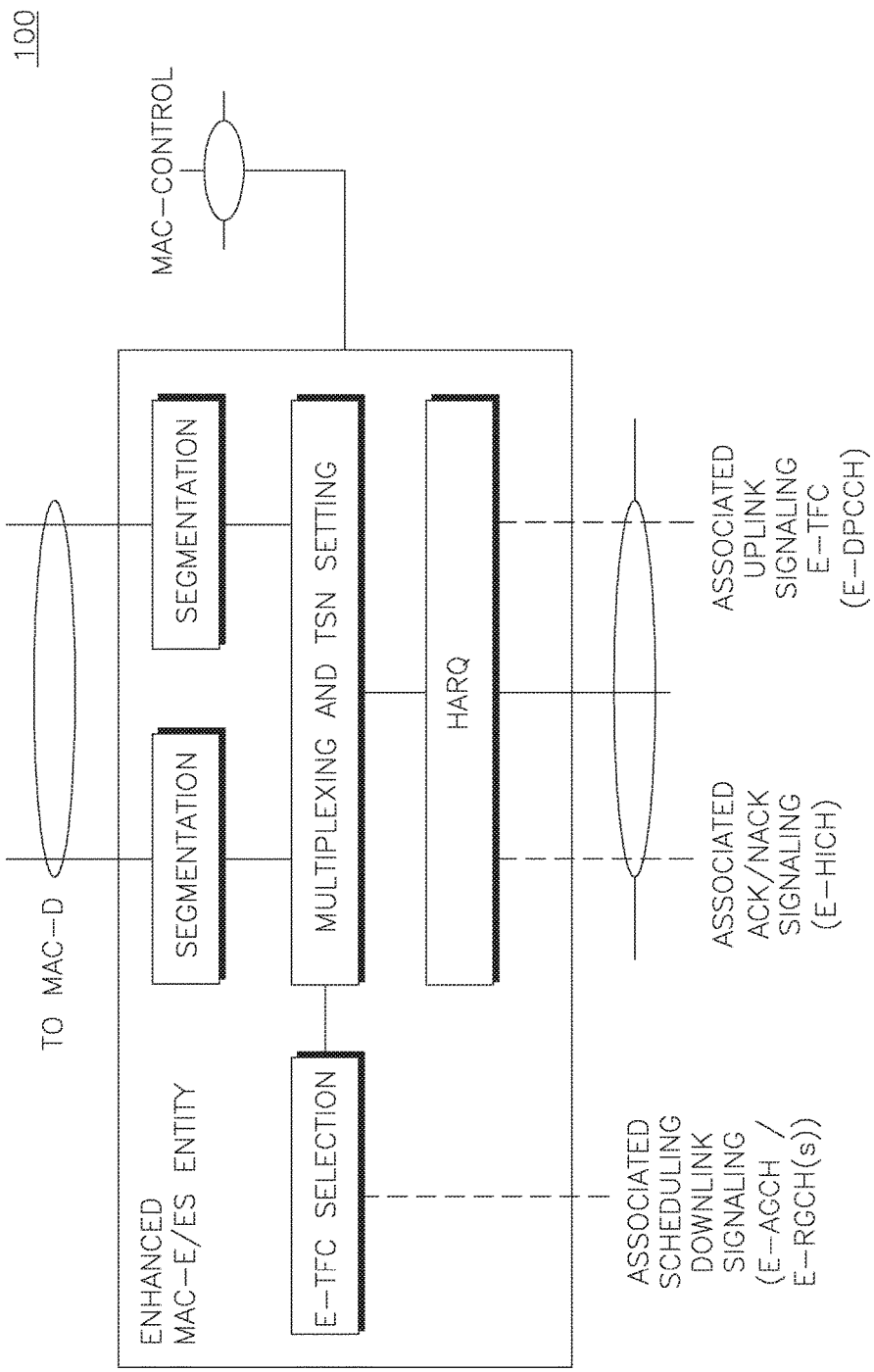
FIG. 1 is a block diagram of a enhanced MAC-e/es entity of a WTRU.
Figure 2:
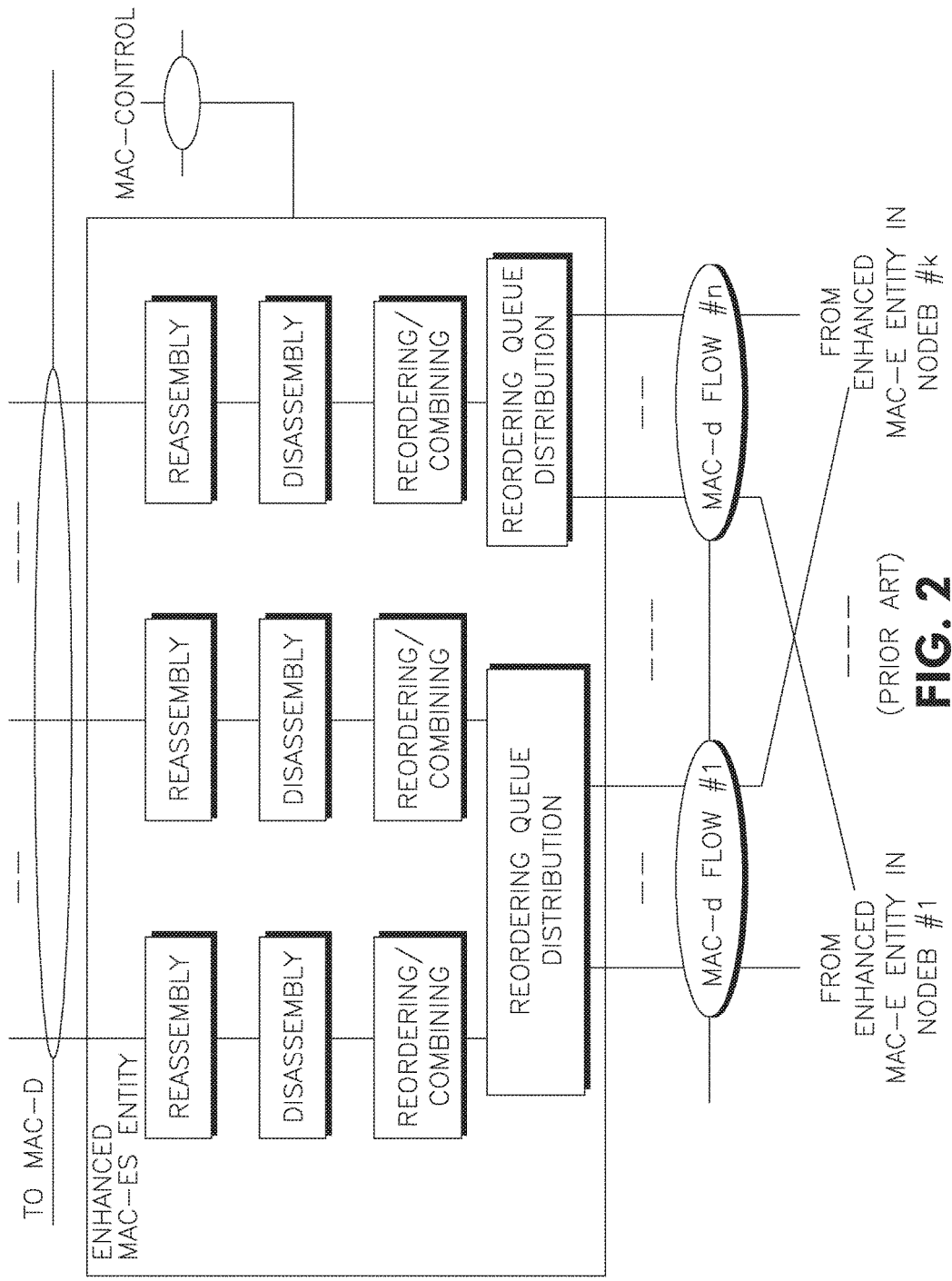
Figure 3:
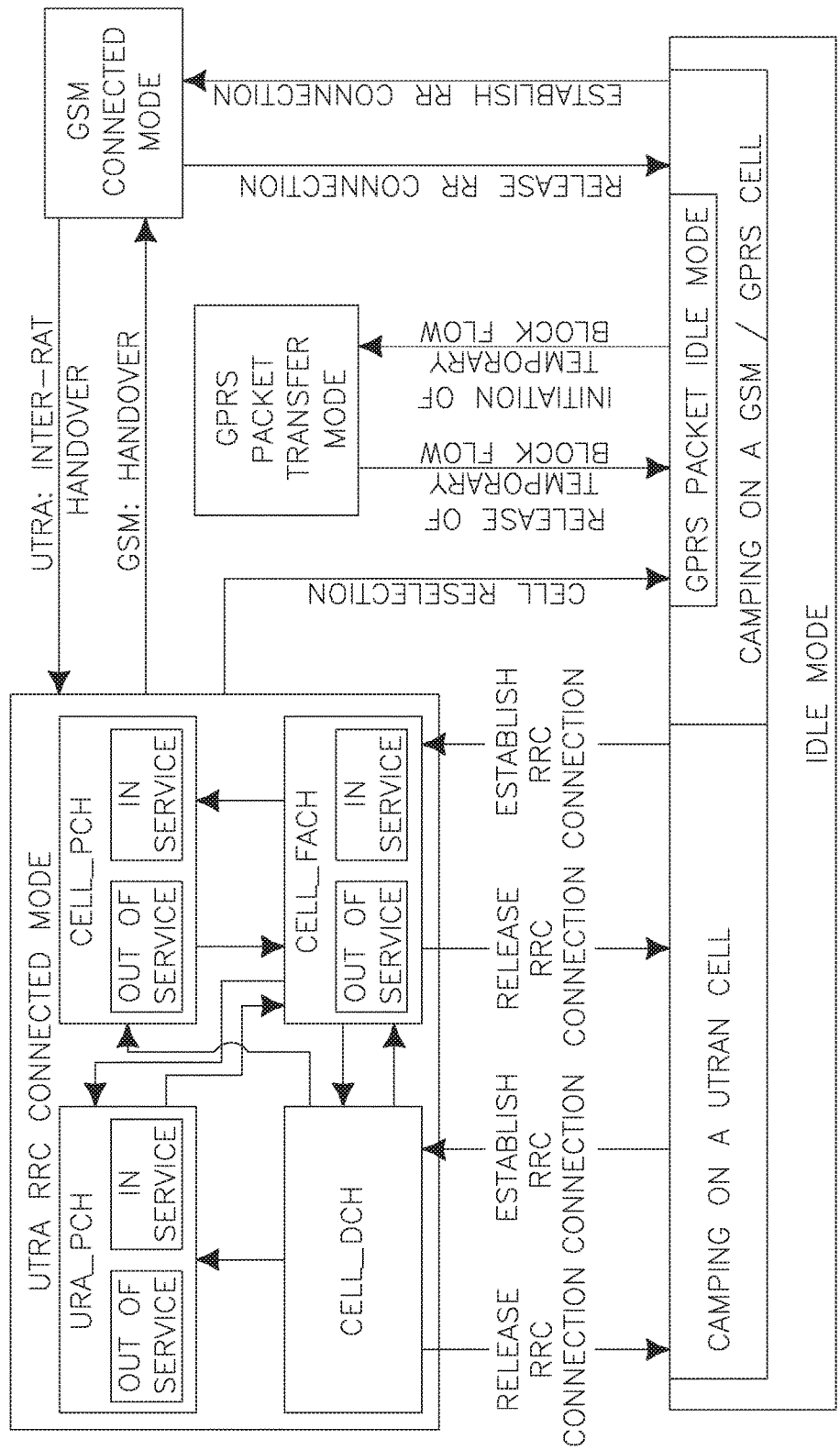
FIG. 3 is a block diagram of the RRC states in an HSPA+ system.
Figure 4:
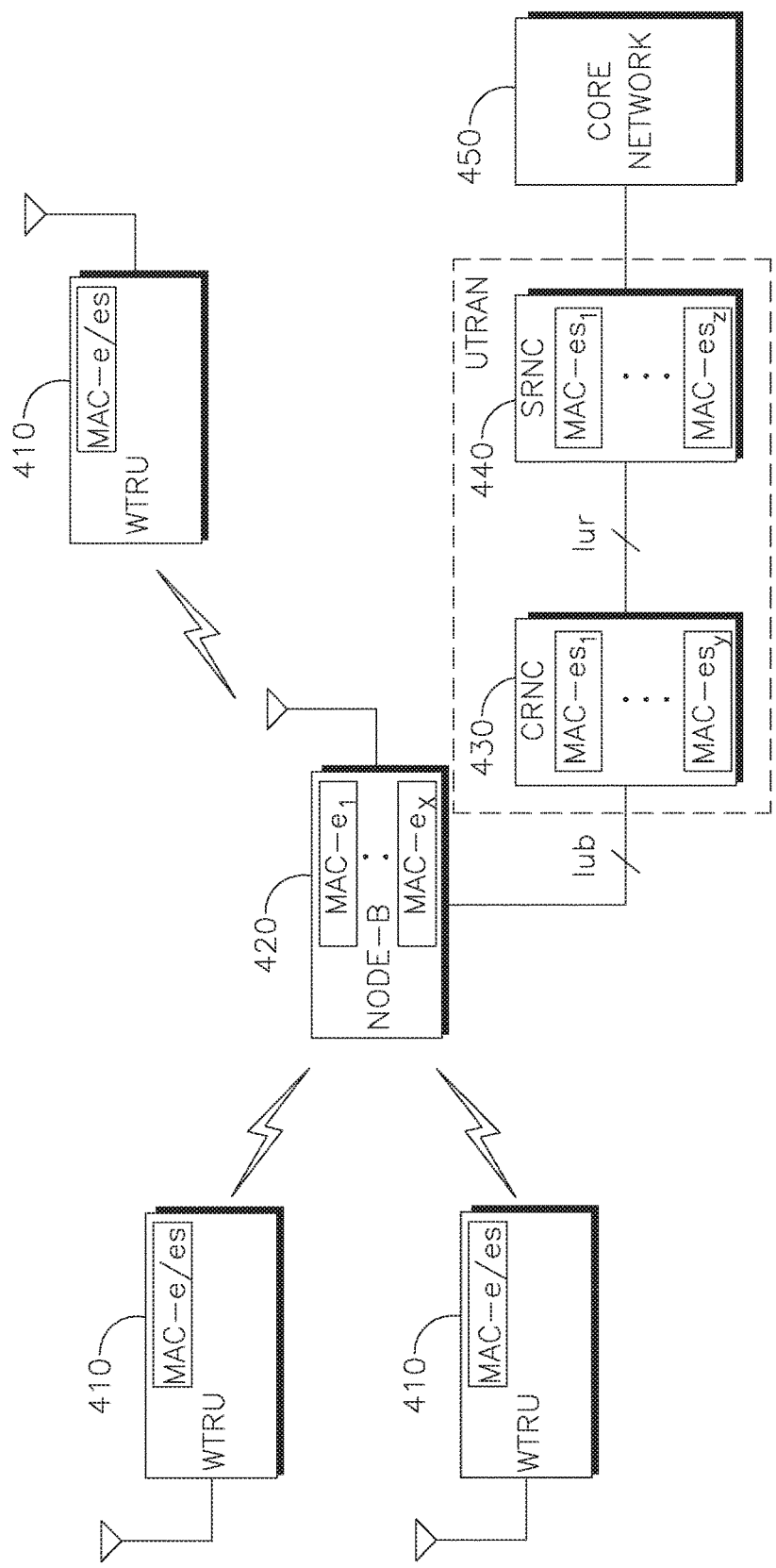
FIG. 4 shows an example wireless communication system including a plurality of wireless transmit/receive units (WTRUs), a base station, and a radio network controller (RNC)

FIG. 4 shows a wireless communication system 400 including a plurality of WTRUs 410, a Node-B 420, a CRNC 430, an SRNC 440 and a core network 450. As shown in FIG. 4, the WTRUs 410 are in communication with the Node-B 420, which is in communication with the CRNC 430 and the SRNC 440. Although three WTRUs 410, one Node-B 420, one CRNC 430, and one SRNC 440 are shown in FIG. 4, it should be noted that any combination of wireless and wired devices may be included in the wireless communication system 400.

When referred to hereafter, the CRNC 430 and the SRNC 440 may be collectively referred to as the UTRAN.

Figure 5:
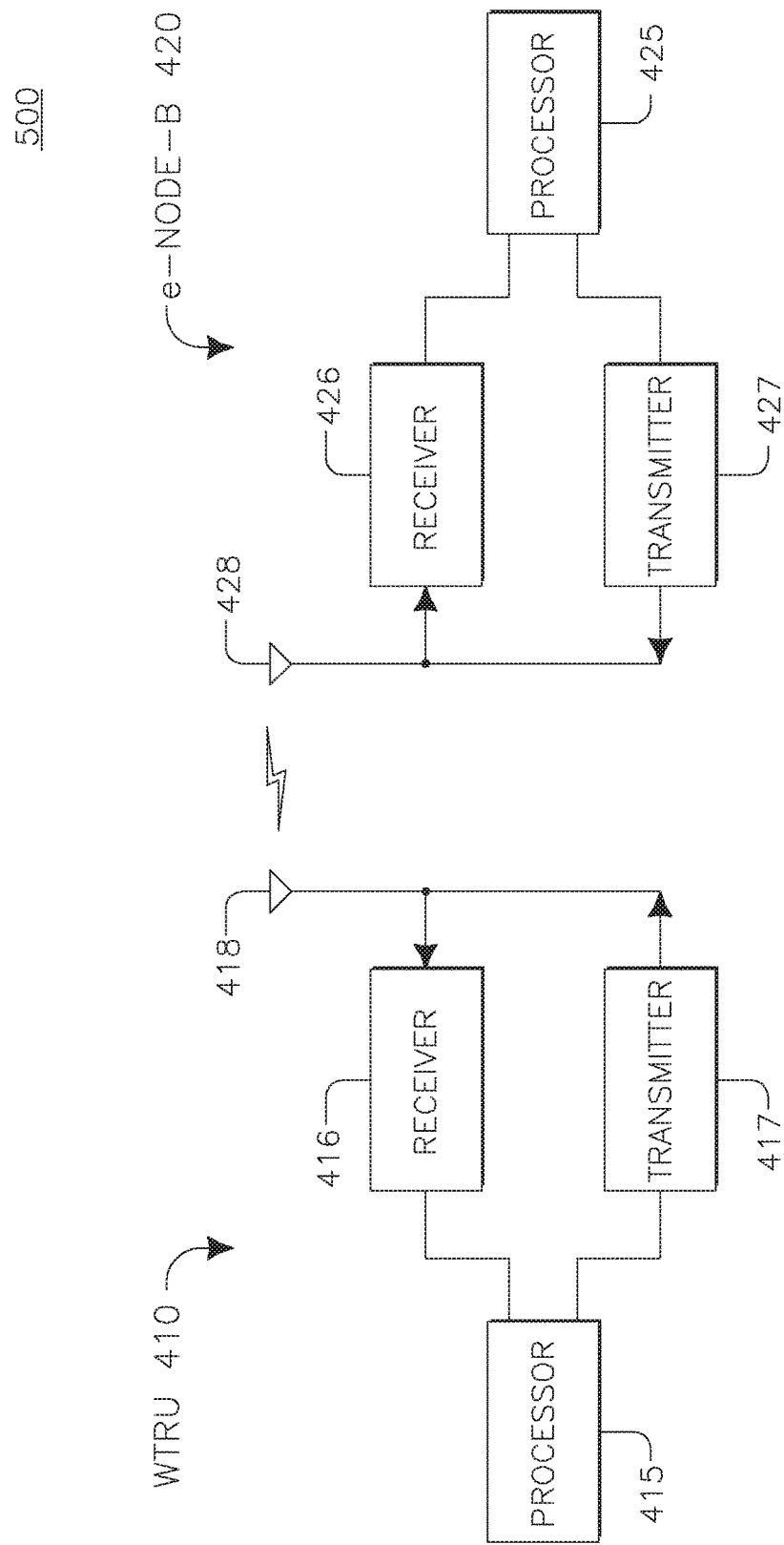
FIG. 5 is a functional block diagram of a WTRU and the base station of FIG. 4.

FIG. 5 is a functional block diagram 500 of a WTRU 410 and the Node-B 420 of the wireless communication system 400 of FIG. 4. As shown in FIG. 5, the WTRU 410 is in communication with the Node-B 420 and both are configured to perform a method to manage and setup enhanced MAC-e/es resources in a Cell_FACH state.

In addition to the components that may be found in a typical WTRU, the WTRU 410 includes a processor 415, a receiver 416, a transmitter 417, and an antenna 418. The processor 415 is configured to perform a method to manage and setup enhanced MAC-e/es resources in a Cell_FACH state. The receiver 416 and the transmitter 417 are in communication with the processor 415. The antenna 418 is in communication with both the receiver 416 and the transmitter 417 to facilitate the transmission and reception of wireless data.

In addition to the components that may be found in a typical base station, the Node-B 420 includes a processor 425, a receiver 426, a transmitter 427, and an antenna 428. The processor 425 is configured to perform a method to manage and setup enhanced MAC-e/es resources in a Cell_FACH state. The receiver 426 and the transmitter 427 are in communication with the processor 425. The antenna 428 is in communication with both the receiver 426 and the transmitter 427 to facilitate the transmission and reception of wireless data.

The WTRU 410 may be configured to transmit on the E-RACH to register the WTRU 410 to the network for an initial RRC connection request, cell selection, and reselection. The connection requests are transmitted over the common control channel (CCCH). Once the WTRU is registered, the WTRU may transmit Dedicated Traffic Channel (DTCH) or Dedicated Control Channel (DCCH) traffic to the network. Wherein the DTCH is a bi-directional channel that carriers user data and DCCH traffic comprises dedicated control information between a WTRU and the UTRAN. It is established through the RRC (Radio Resource Control)

connection setup procedure. However, when the WTRU 410 is transmitting an initial E-RACH access attempt, the enhanced MAC-e and enhanced MAC-es entities may or may not be setup. Accordingly, several alternatives to configuring the enhanced MAC-e and enhanced MAC-es are described in greater detail herein.

Referring back to FIG. 4, the WTRU 410 may be configured with an enhanced MAC-e/es entity 419 when both the WTRU 410 and the network support the E-RACH, (i.e. capable of using the E-DCH in the CELL_DACH state) and the HS-DSCH. Wherein the HS-DSCH is a downlink transport channel shared by several WTRUs. The HS-DSCH is associated with one downlink dedicated physical channel (DPCH) and one or several highspeed shared control channels (HS-SCCHs). The enhanced MAC-e/es entity 419 in the WTRU 410 may include a HARQ module, a multiplexing and TSN module, an E-TFC selection module, segmentation modules, a module used to append an E-RNTI, and a module used for CRC calculation for Common Control Channel (CCCH) traffic. The CCCH supports common procedures required to establish a dedicated link with the UTRAN. The CCCH may include the RACH and E-RACH, the forward access channel (FACH), and the paging channel (PCH). The enhanced MAC-e/es entity 419 may also include an access class control module. The WTRU 410 may transition to the Cell_FACH state when there is uplink data to transmit, or it is already in the Cell_DCH state and the network moves it to the Cell_FACH state for lack of activity, etc. The WTRU 410 may be configured to maintain the enhanced MAC-e/es entity as long as it is able to transmit uplink data on the E-DCH. The WTRU 410 may further be configured to maintain the enhanced MAC-e/es entity when operating in idle mode when an RRC connection request is initiated by the WTRU 410.

The Node-B 420 may be configured with x enhanced MAC-e entities (enhanced MAC-e1 to enhanced MAC-ex), where x is the number of common E-DCH resources for all types of traffic. Each enhanced MAC-e entity may include an E-DCH scheduling module, an E-DCH control module, a de-multiplexing module, and a HARQ module. The enhanced MAC-e entities may also be configured to read the E-RNTI used for contention resolution. The enhanced MAC-e entities may be configured to communicate with WTRUs that have not been assigned a U-RNTI or E-RNTI, in which case the WTRUs will communicate via the CCCH. Each enhanced MAC-e entity may be associated to a common E-DCH resource that a WTRU acquires as part of the random access procedure. For example, the Node-B 420 may be configured to use an enhanced MAC-e entity while a WTRU is attempting an E-RACH access and/or after the WTRU has performed cell selection/reselection (i.e. DTCH/DCCH traffic). The enhanced MAC-e entities may be pre-configured in the Node-B 420 (i.e. setup when the E-DCH resource pool for the CELL_FACH state and idle-mode is provided to the Node B) or it may be setup in response to a signal received from a WTRU or RNC. Alternatively, the Node-B 420 may be configured to setup and maintain one dedicated enhanced MAC-e entity for each WTRU, for as long as the WTRU in a given state.

The CRNC 430 may be configured with y enhanced MAC-es entities (enhanced MAC-est to enhanced MAC-esy) used only for CCCH traffic, where y is the number of common E-DCH resources in the cell. Each enhanced MAC-es entity is associated to a common E-DCH resource set that may be used by a WTRU. Each enhanced MAC-es entity may include a disassembly module, a reordering and queue distribution module, a reordering module, a macro-diversity selection module, a reassembly module, and a CRC error correction module. Each enhanced MAC-es entity may be used during communications with a WTRU that has not been assigned a U-RNTI or E-RNTI (i.e. for CCCH traffic). The CCCH traffic may be terminated in the CRNC 430 such that the CCCH data traffic is not forwarded to the SRNC 440. Alternatively, the CRNC 430 may be configured to setup one dedicated enhanced MAC-es entity for each WTRU, for as long as the WTRU in a given state.

The SRNC 440 is configured with z enhanced MAC-es entities (enhanced MAC-est to enhanced MAC-esz) for the DTCH/DCCH traffic, wherein z is the number of WTRUs in the Cell_FACH state. Each of the z enhanced MAC-es entities may be associated with the WTRU 410 after its WTRU-id is determined. Each enhanced MAC-es entity may comprise a disassembly module, a reordering and queue distribution module, a reordering module, a macro-diversity selection module, and a reassembly module. The SRNC 440 may be configured to setup the enhanced MAC-es entity in response to the WTRU entering the Cell_FACH state. The DTCH/DCCH traffic terminates in the SRNC 440.

Alternatively, the Node-B 420 and the CRNC 430 may be configured to maintain one dedicated enhanced MAC-e and MAC-es entity, respectively, for each WTRU as long as the WTRU is in the Cell_FACH state, independent of the E-DCH resources.

Alternatively, the Node-B 420 and the CRNC 430 may be configured to setup enhanced MAC-e and enhanced MAC-es entities after the Node-B 420 assigns and transmits an E-DCH radio network temporary identifier (E-RNTI) for the WTRU 410.

In some scenarios, the SRNC 440 may not know the WTRU's 410 identity until the first transmission of the WTRU 410, which is after reception of the acquisition indicator channel (AICH) or the E-AICH. In such a case, the SRNC 440 may be configured to setup the enhanced MAC-es for the WTRU 410 at the time the WTRU-ID is read from the header. Accordingly, a new Iub signaling procedure may be required to indicate to the SRNC 440 to setup the enhanced MAC-es entity for a given WTRU.

When common enhanced MAC-e and/or enhanced MAC-es resources are setup for a given connection, they may be setup as part of the common transport channel setup procedure between an RNC and the Node-B 420.

Figure 6:
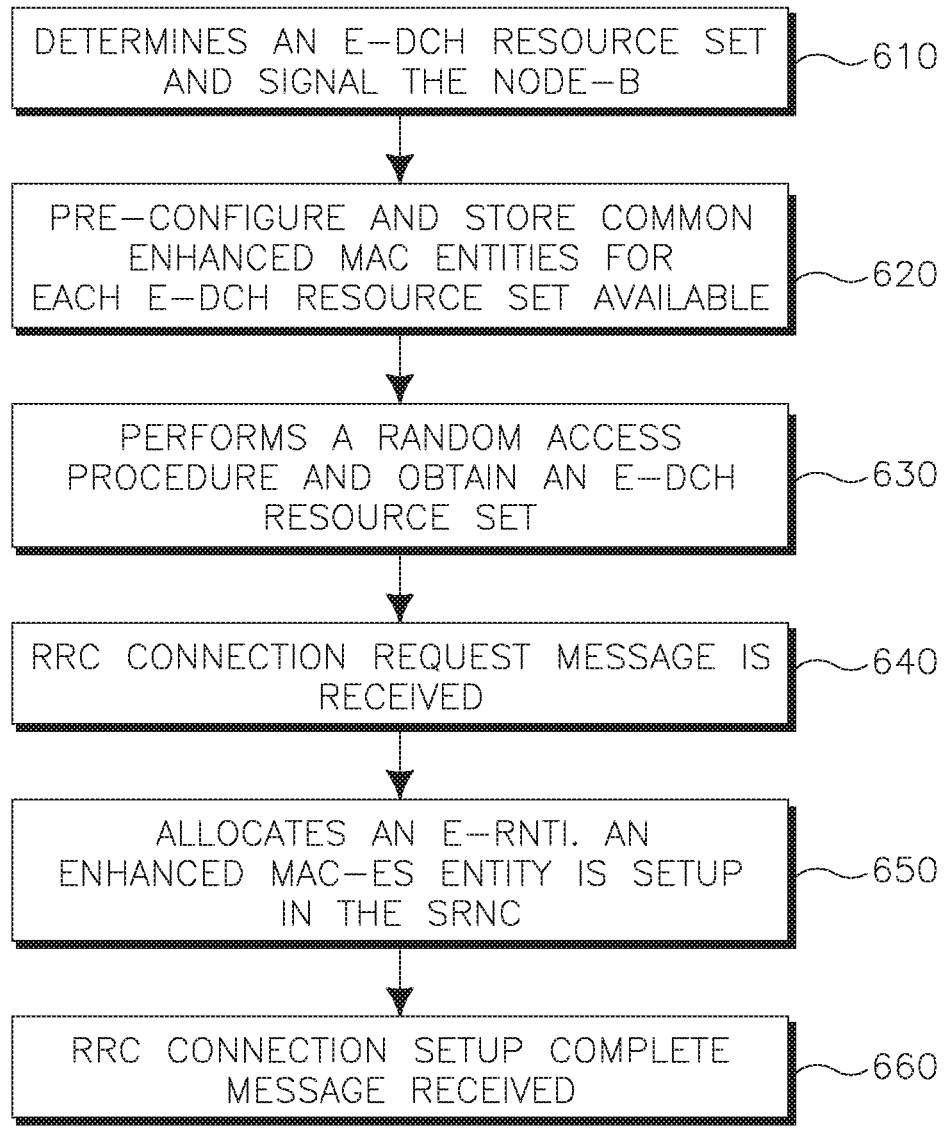
FIG. 6 is a flow diagram of a method where the enhanced MAC-e and enhanced MAC-es entities are preconfigured as common entities for each enhanced dedicated channel (E-DCH) resource set that may be assigned to the WTRU upon an E-RACH access procedure.

FIG. 6 is a flow diagram of a method where the CRNC 430 pre-configures and stores a common enhanced MAC-es entity and the Node-B 420 pre-configures and stores a common enhanced MAC-e entity for each enhanced dedicated channel (E-DCH) resource set that may be assigned to a WTRU upon an E-RACH access procedure. Referring to FIG. 6, the CRNC determines an E-DCH resource set and signals the Node-B (610). The CRNC and Node-B pre-configure and store common enhanced MAC-es and enhanced MAC-e entities, respectively, for each E-DCH resource set available (620). A WTRU performs a random access procedure obtains an E-DCH resource set (630). An RRC connection request message is received from a WTRU in Idle Mode using the E-DCH set that is obtained using the random access procedure (640). The Node-B allocates an E-RNTI and an enhanced MAC-es entity is setup in the SRNC for the WTRU (650).

Since the CRNC's enhanced MAC-es and the Node-B's enhanced MAC-e entities are preconfigured for the E-DCH resource set, the enhanced MAC-e and enhanced MAC-es for the CCCH may be configured to operate as common entities that are associated with one WTRU at a time (i.e. for the WTRU that received the E-RACH access). In one option, the common enhanced MAC-e and MAC-es entities may be used for only the WTRU's initial traffic. Alternatively the enhanced MAC entities may be used throughout the time the WTRU is communicating via the E-DCH resource set corresponding to that enhanced MAC entity. An RRC connection setup complete message may then be received indicating that the WTRU is in connected mode (660).

The enhanced MAC-es entity in the CRNC may be associated to a common E-DCH resource set used by the WTRU 410, or a common E-RNTI that is selected by the WTRU 410. The SRNC 440 may be configured to setup a dedicated enhanced MAC-es entity for each WTRU operating in the Cell_FACH state which is registered and has an E-RNTI allocated, and the entity may be maintained at least for the duration of the WTRU being in the Cell_FACH/CELL_PCH state for DTCH/DCCH traffic. For DTCH/DCCH traffic, the data is first received in the common enhanced MAC-e entity associated to the common E-DCH resource being used by the UE and then forwarded to the dedicated enhanced MAC-es entity in the SRNC over the Iub/Iur interface. Accordingly, when the enhanced MAC-e is a common entity for any WTRU using the set of resources, a process to identify the WTRU-ID over the Iub/Iur frame protocol may be desired. Several alternatives are described in greater detail hereafter.

In a first alternative, the Node-B 420 may be configured to transmit data on a common transport channel (for WTRUs using the E-DCH in the Cell_FACH state) using an Iub flow. Because the Iub is a common flow, the CRNC 430 may receive data from this common flow per WTRU and does not know to which WTRU this data belongs. Therefore, the Node-B 420 may be configured to transmit a WTRU-ID in the header field of the Iub frame when the enhanced MAC-es is associated with a particular WTRU in the Cell_FACH state (i.e. for DTCH/DCCH traffic). Similarly the CRNC 430 may be configured to transmit a WTRU-ID in the header of an Iur frame. The WTRU-id may comprise an E-RNTI when transmitted via the Iub interface or an S-RNTI when transmitted via the Iur interface. This would allow the SRNC 440 to know proper forwarding address of the data to the correct dedicated enhanced MAC-es entity for the WTRU.

In another alternative, the WTRU-id may comprise one or a combination of the E-RNTI, the U-RNTI, or C-RNTI, or the S-RNTI. For CCCH traffic, no WTRU-id is present and thus the Iub frame protocol shall not include an E-RNTI. The CRNC 430 may be configured to detect that the traffic belongs to CCCH traffic from the logical channel identifier and forward the data to the correct enhanced MAC-es entity in the CRNC 430 that is associated to the proper E-DCH resource. In an optional embodiment, there may be one common transport channel for DTCH/DCCH traffic, and one transport channel setup for each E-DCH resource set for CCCH traffic. The Node-B 420 may be configured to receive the CCCH traffic and to forward the data to the transport channel associated with the enhanced MAC-e entity in which the data was received.

In another alternative, when both the Node-B 420 and the CRNC 430 are configured to setup the common enhanced MAC-e and enhanced MAC-es entities, the WTRU 410 may be configured to transmit a WTRU-id in an enhanced MAC-es header of an enhanced MAC-es PDU. The Node-B 420 may be further configured with a disassembly module capable of to decoding the enhanced MAC-es PDU header and determining the WTRU-id. By transmitting the information in the enhanced MAC-es PDU, the Node-B 420 does not need to transmit an Iub frame with the WTRU-id information. For example, the WTRU 410 may be configured to transmit the WTRU-id in the enhanced MAC-es header only during the initial transmissions for contention resolution purposes. In this case, the Node-B 420 may be configured with an enhanced MAC-e entity that uses the initial transmission to determine forwarding procedures for consecutive data on subsequent transmissions to the RNC. The WTRU 410 may transmit the WTRU-id until it receives an absolute grant of the E-DCH channel, at which point the WTRU 410 can stop transmitting the WTRU-id.

In another alternative, the Node-B 420 may be configured to receive a WTRU-id from a WTRU, and to extract the WTRU-id from the first transmission. The Node-B 420 may then store the WTRU-id and use this information to transmit the WTRU-id to the SRNC 440 or CRNC 430 using Iub signaling during subsequent transmissions. When the WTRU 410 releases the set of E-DCH resources the Node-B 420 may be configured to erase the WTRU-id. Alternatively, if a subsequent E-RACH access attempt is performed and a different WTRU-id is decoded, the Node-B 420 may change the stored WTRU-id information to reflect the new WTRU-id.

In yet another alternative, after a Node-B 420 receives a first transmission from a WTRU, the Node-B 420 may use the first transmission to determine to which WTRU the data belongs. Once the WTRU-id is determined, the Node-B 420 may setup a semi-dedicated flow to the RNC for the duration of the WTRU's connection to the E-DCH resources. This creates a temporary connection flow between the common enhanced MAC-e and the dedicated enhanced MAC-es. This may be setup by transmitting an Iub signal notifying the RNC to initiate the setup a flow between the common enhanced MAC-e and enhanced MAC-es entity corresponding to the WTRU. In this case, the WTRU-id does not have to be specified in the Iub frame protocol because the WTRU-id is present in the enhanced MAC-e header of every transmission and the information is forwarded to the RNC via the Iu frame protocol.

Alternatively, because the E-DCH resources may be negotiated between the Node-B 420 and the WTRU without the involvement of the RNC, the functionalities related to the E-DCH, such as enhanced MAC-es, may be moved to the Node-B 420. For this embodiment, the logical channel flows may be setup between the enhanced MAC-es and the radio link control (RLC) entities. Alternatively, the WTRU 410 and the Node-B 420 may establish a common transport channel and the WTRU-id and a linearization channel (LCH)-ID may be transmitted over the Iub and/or Iur frame protocol.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

The invention claimed is:

1. A method implemented by a radio network controller (RNC) of managing medium access control (MAC) resources, the method comprising:
    configuring an enhanced MAC-es entity in the RNC for a common enhanced dedicated channel (E-DCH) resource, wherein the common E-DCH resource is used for communications with a wireless transmit/receive unit (WTRU) using common control channel (CCCH) transmissions; and
    sending an indication to a Node-B to configure an enhanced MAC-e entity in the Node-B for the common E-DCH resource,
    wherein the enhanced MAC-es entity in the RNC operates with the enhanced MAC-e in the Node-B as common entities associated with the WTRU, and wherein when the common entities are associated with the WTRU, the common entities are not associated with any other WTRU.

2. The method of claim 1, wherein the enhanced MAC-es entity in the RNC is a dedicated enhanced MAC-es entity that is maintained for the WTRU.

3. The method of claim 1, wherein the RNC is a serving RNC.

4. The method of claim 1, wherein the RNC is a controlling RNC (CRNC) and the CCCH transmissions are terminated in the CRNC.

5. A Node-B comprising:
    a processor to configure an enhanced MAC-e entity in the Node-B for a common enhanced dedicated channel (E-DCH) resource, wherein the enhanced MAC-e entity includes a controller, a de-multiplexor, and a hybrid automatic repeat request (HARQ) entity; and
    a transmitter to transmit data from the enhanced MAC-e entity to a wireless transmit/receive unit (WTRU) over a common transport channel,
    wherein the enhanced MAC-e entity in the Node-B operates with an enhanced MAC-es entity in a radio network controller (RNC) as common entities associated with the WTRU and wherein when the common entities are associated with the WTRU, the common entities are not associated with any other WTRU.

6. The Node-B of claim 5, wherein the processor communicates with the WTRU via the configured enhanced MAC-e entity associated with the common E-DCH resource.

7. The Node-B of claim 5, wherein the enhanced MAC-e entity in the Node-B is a dedicated enhanced MAC-e entity maintained for the WTRU in communication with the Node-B.

8. The Node-B of claim 5, wherein the common E-DCH resource is configured for the WTRU in communication with the Node-B.

9. A controlling radio network controller (CRNC), comprising:
    a processor to configure an enhanced MAC-es entity in the CRNC for a common Enhanced Dedicated Channel (E-DCH) resource, wherein the common E-DCH resource is used for communications with a wireless transmit/receive unit (WTRU) using common control channel (CCCH) transmissions and wherein the enhanced MAC-es entity includes a disassesmbler, a reordering and queue distribution entity, a reordering entity, a reassembler and a cyclic redundancy check (CRC) error detector; and
    a transmitter to send an indication to a Node-B to configure an enhanced MAC-e entity in the Node-B for the common E-DCH resource,
    wherein the enhanced MAC-es entity in the CRNC operates with an enhanced MAC-e entity in a Node-B as common entities associated with the WTRU and wherein when the common entities are associated with the WTRU, the common entities are not associated with any other WTRU.

10. The CRNC of claim 9, wherein the enhanced MAC-es entity in the CRNC is a dedicated enhanced MAC-es entity maintained for the WTRU.

11. The CRNC of claim 9, wherein the CCCH transmissions are terminated in the CRNC.

* * * * *